Oct. 31, 1961 G. V. ROCH 3,006,075
ENDLESS TAPE MEASURING DEVICE
Filed May 25, 1960 3 Sheets-Sheet 1

INVENTOR
GERALD V. ROCH
BY Herbert A. ......
ATTORNEY

Oct. 31, 1961 G. V. ROCH 3,006,075
ENDLESS TAPE MEASURING DEVICE
Filed May 25, 1960 3 Sheets-Sheet 2
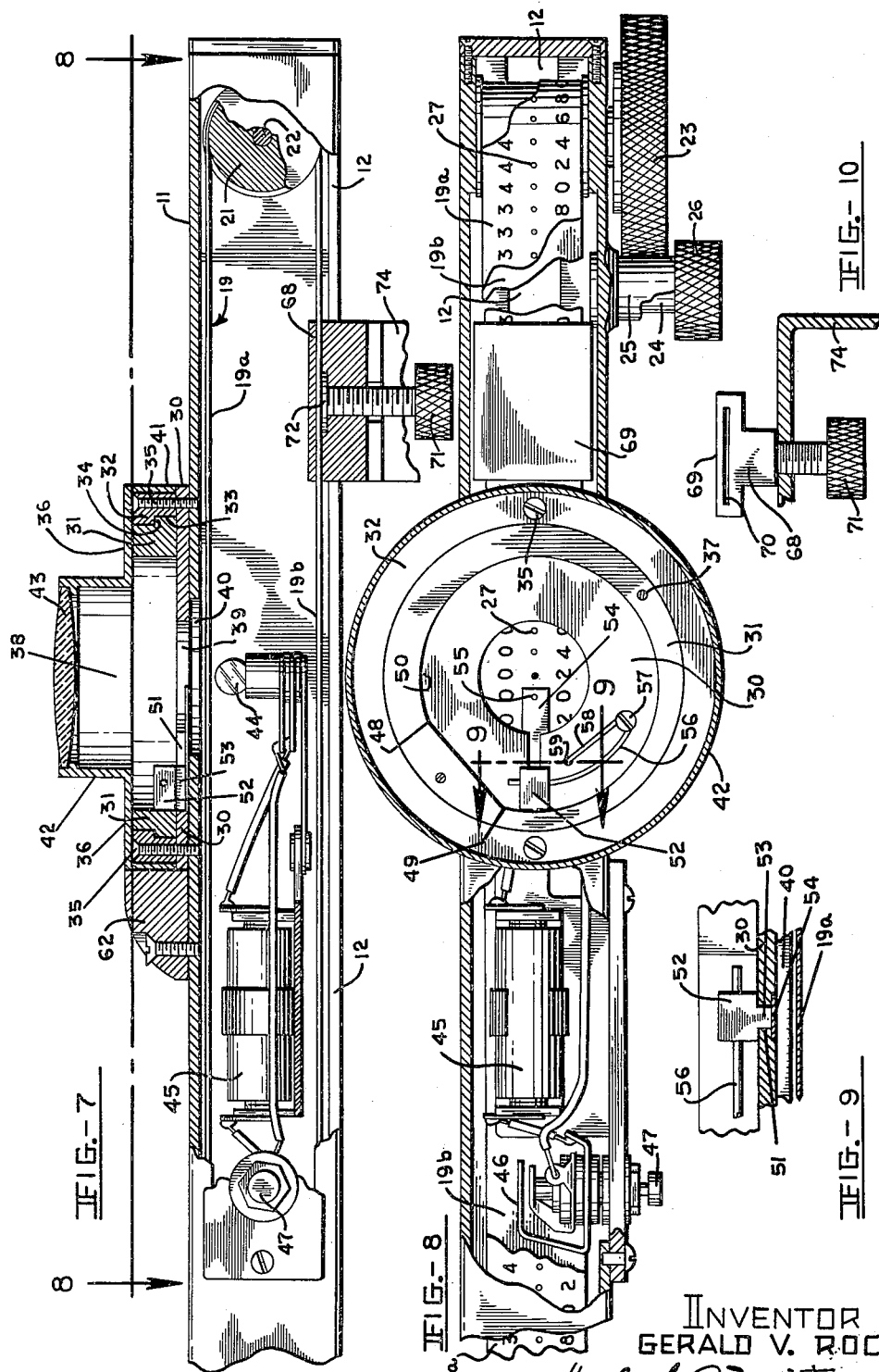
INVENTOR
GERALD V. ROCH
BY Herbert A. Weinturn
ATTORNEY Oct. 31, 1961　　　　G. V. ROCH　　　3,006,075
ENDLESS TAPE MEASURING DEVICE
Filed May 25, 1960　　　　　　　　　　3 Sheets-Sheet 3
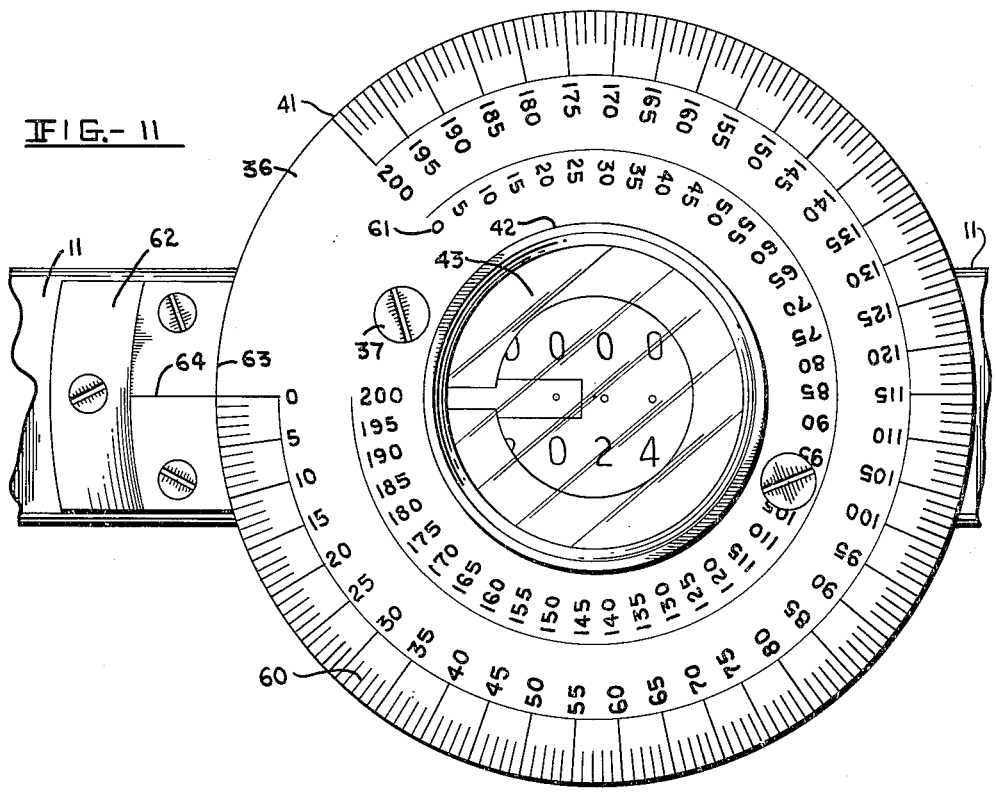
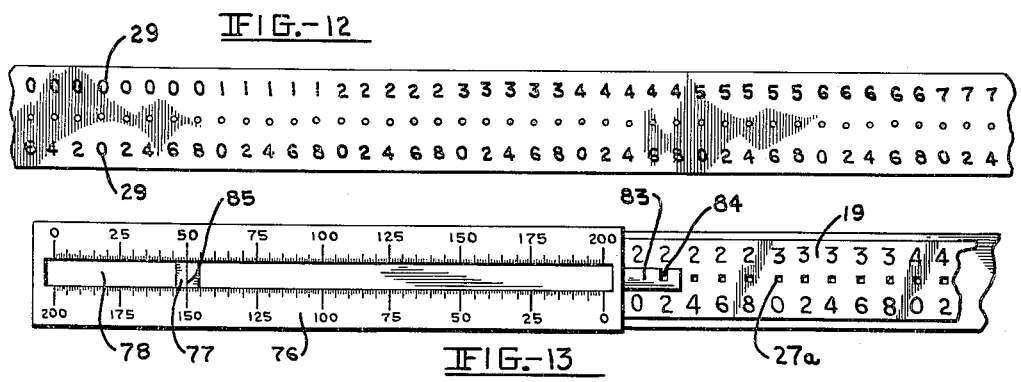
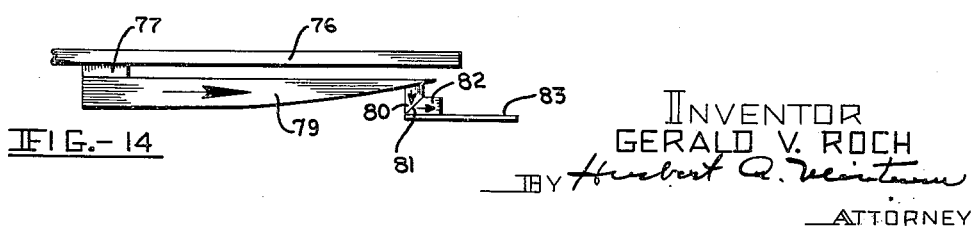
INVENTOR
GERALD V. ROCH
BY Herbert A. Weintraub
ATTORNEY

United States Patent Office 3,006,075
Patented Oct. 31, 1961

3,006,075
ENDLESS TAPE MEASURING DEVICE
Gerald V. Roch, 8001 Fishback Road, New Augusta, Ind.
Filed May 25, 1960, Ser. No. 31,748
5 Claims. (Cl. 33—125)

This invention relates to a measuring device or system which employs an endless tape whereby the travel of a cutting tool in relation to a fixed base or body portion may be determined in setting up the work to be operated upon without having to go through any prolonged computation of adding or subtracting various increments of measurement.

It is a primary purpose of the present invention to provide a measuring device whereby a zero point is initially determined in relation to the work, and then the tape may be shifted to a zero position; the tape interconnected with the fixed body on which the bed travels; and finally the table is moved to the left or right depending upon the direction of the intended travel of the table during the cutting operation, the distance of the movement of the table being in accordance with a predetermined measurement such as is obtained from a blueprint showing the length or depth or cut to be taken on the work; this table movement being carried to an exact distance from that zero point as will be determined by reading figures on the tape to obtain the major dimension in inches and tenths, and then by means of a fine reading arrangement to read thousandths of one inch in addition to or less than the reading obtained from the tape.

A further primary object of the invention resides in the simplicity of the structure, together with an extremely high degree of accuracy. The device does not depend upon any highly refined optical system of lenses other than a possible magnification of the reading of the figures on the tape.

These and many other objects and advantages of the invention will become apparent to those versed in the art in the description of one particular form of the invention as illustrated in the accompanying drawings, in which FIG. 1 is a view in top plan of the structure embodying the invention as applied to a cutting machine;

FIG. 7 is a view in longitudinal vertical section;

FIG. 8 is a transverse section on the line 8—8 in FIG. 7;

FIG. 9 is a detail in transverse vertical section on the line 9—9 in FIG. 8;

FIG. 10 is a detail in end elevation of a tape anchoring device;

FIG. 11 is a top plan view of the measurement reading device on a much enlarged scale;

FIG. 12 is a view of a length of measuring tape;

FIG. 13 is a view in top plan of a modified structure for reading measurements from the tape; and FIG. 14 is a detail in inside elevation in diagrammatic form of the modified vernier structure of the form in FIG. 13.

Figure 3:
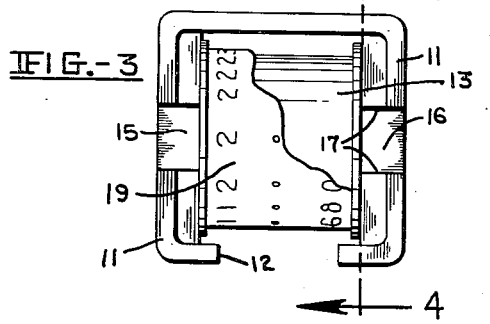
FIG. 3 is a view in left hand elevation of the device as viewed in FIG. 1 with an enclosing protective plate removed on an enlarged scale.
Figure 4:
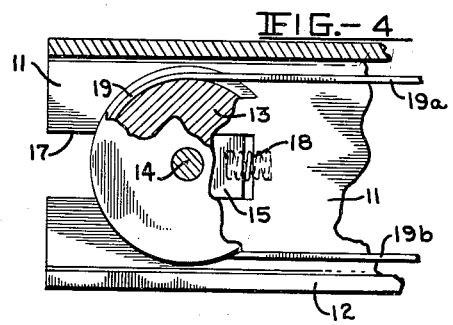
FIG. 4 is a view in vertical longitudinal section on the line 4—4 in FIG. 3.
Figure 6:
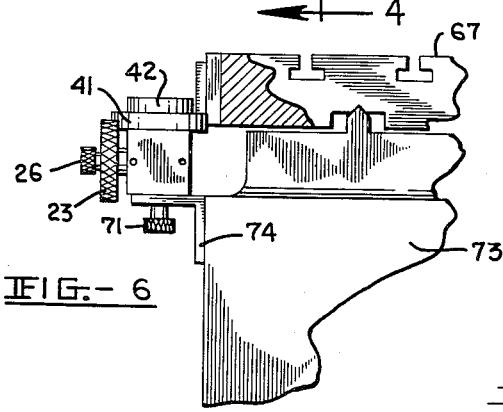
FIG. 6 is a detail in right hand elevation of the device as applied to the machine.
Figure 5:
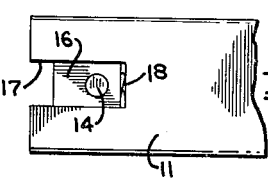
FIG. 5 is a detail in side elevation of the left hand end of the device on a reduced scale.

A length of rectangular tubing 11 has its entire underside centrally slotted longitudinally thereof, as indicated by the numeral 12. Inside of this tube 11, and at the left hand end thereof is mounted a pulley or roller 13 on a shaft 14 extending transversely across the tube 11. This pulley 13 has its shaft 14 rotatively mounted in pillow blocks 15 and 16, FIG. 3, each of which is slidably mounted in a longitudinal slot 17 entering the side walls respectively of the tube 11. These blocks 15 and 16 are urged toward the left hand end of the tube 11 by means of a compression spring 18 mounted between the inner end of the slot 17 and the right hand end of the pillow blocks 15 and 16. An endless tape, preferably a steel tape 19 passes around the pulley 13 and extends along inside of the tube 11 to the right hand end portion thereof where it extends around a pulley 21 which is fixed on a transverse shaft 22 extending transversely across the tube 11 and rotatably carried by the side walls thereof. The spacing apart of the shaft 22 from the shaft 14 is made to be such that the tape 19 is tensioned by means of the pressure of the spring 18 against the traveling pulley 13 mounting system.

The pulley 21 is fixed to the shaft 22. An end of the shaft 22 extends through the wall of the tube 11 to carry on its outer extremity a wheel 23, preferably knurled around its periphery so that the wheel may be rotated in order to drive the tape 19 around the two pulleys 13 and 21. There is mounted on the tube 11 a shaft 24 which extends rotatably from the tube 11 in parallelism with the shaft 22. Preferably a friction surface 25, such as rubber or synthetic rubber surrounds this shaft 24 externally of the tube 11, and there is a small diameter wheel or a knob 26 fixed on the outer end of this shaft 24 as a means for turning the shaft. The surface 25 is in resilient contact with the periphery of the wheel 23 so that by turning the knob 26, the wheel 23 may be driven accordingly.

The tape 19 is provided in spaced apart relation, longitudinally of its length with either transverse slits or circular openings therethrough, herein shown as small diameter circular openings 27. These openings 27 must be very accurately spaced apart, preferably along a center line of the tape in order to insure the desired accuracy of the measuring device. They are spaced apart two-tenths of an inch. The locations of these openings through the tape are indicated by series of numerals along opposite marginal edge portions of the tape. One set of numerals increase in one direction while the other set of numerals increase in the opposite direction, both directions being based from a "zero zero" position indicated by the numeral 29, FIG. 12. The series along one marginal edge represent the numerals progressively in one digit place and the series along the other marginal edge represent the numerals associated with the next digit place. There are two such sets of associated series on different longitudinal portions of the tape.

The tube 11 in the form as illustrated in FIGS. 1–8 has mounted on its topside a circular plate 30, FIG. 7. On top of the plate 30 is positioned a cam block 31. This cam block fits within a ring 32 by a shoulder portion 33 engaging in an under cut portion 34. The ring 32 is anchored in fixed position by means of screws 35 rotatably passing downwardly through the ring 32, rotatably through the plate 30 and screw-threadedly into the topside of the tube 11. In this manner, the cam ring 31 is free to revolve within the ring 32 and yet be retained slidingly against the plate 30.

A dial plate 36 is attached to the cam ring 31 in any suitable manner, such as by screws 37. The plate 36 has a central opening 38 therethrough axially aligned with a central opening 39 through the plate 30 and through an opening 40 in the top of the tube 11. This centering of the plate 36 is facilitated by reason of there being a downturned circumferential skirt 41 fixed to the plate, and revolubly encircling the ring 32. Around the margin of the opening 38, there is an upwardly extending cylindrical wall 42, in the top of which is mounted a glass cover, or as is herein shown, a magnifying lens 43.

The tape 19 travels across the opening 40. Between the upper and lower flights 19a and 19b of the tape 19 is mounted a lamp 44 which is energized by a cell 45 and a switch 46. The switch 46 is controlled externally of the tube 11 by means of a button 47, the switch 46 normally being open, and closed only while the button 47 is held in an inwardly traveling position. The lamp 44 is employed to have a beam of light therefrom travel upwardly through a hole 27 which may be centered thereover. The inner surface of the cam ring 31 defines a helical surface starting from a line 48 and continuing by an increasing radius around to the point 49 in respect to the vertical axis of the retaining ring 32. This surface is indicated by the numeral 50.

The plate 30 is provided with a slot 51 entering from the opening 39 and extending longitudinally of the tube 11 therefrom centrally of the tube. A follow block 52 rides on the top of the plate 30 and has a neck portion 53 which fits slidingly within the slot 51. On the underside of this neck 53 is fixed a tongue 54 extending out into the opening 39. Throughout the extent of the tongue 54 across the hole 39, the tongue will cover over the openings 27. Near the outer free end of the tongue 54, FIG. 8, is a hole either in a slit or round form, herein shown as being a circular hole 55 which will be in alignment with the tape hole 27. The hole 55 may be of the same diameter as that of the holes 27. The follow block 52 is normally urged by a spring 56 against the surface 50. In the form herein shown, this spring 56 consists of a finger of a wire-like spring which is held in position by an end portion of the finger passing through the block 52, and then the wire is wrapped around a retaining screw 57, with the opposite end portion 58 being carried around and turned downwardly into a hole 59 in the plate 30.

In this manner, the tongue 54 is advanced and retracted as the plate 36 may be rotated. The skirt 41 may be knurled or roughened if desired to provide a grip for the thumb and fingers of the operator to facilitate his rotating the plate 36.

The topside of the plate 36 is graduated throughout by a scale designated by the numeral 60 around the outermost edge portion of the plate. This scale reads from zero around to two hundred, there being a gap between those two figures as indicated in FIG. 11. Each of these spacings in this scale 60 indicate one-thousandth of one inch. Between that scale 60 and the cylindrical wall 42 is a second scale 61 arranged circumferentially around the plate to read in a reverse manner from that of the scale 60 from zero to two hundred, this scale again indicating by its spacing, thousandths of an inch. A block 62 is fixed to the topside of the tube 11 to have a concave surface 63 in close proximity to the periphery of the skirt 41. This block 62 carries the reference line 64 as indicated in FIG. 11; with it may be registered the lines of the scale 60.

*Operation*

Figure 1:
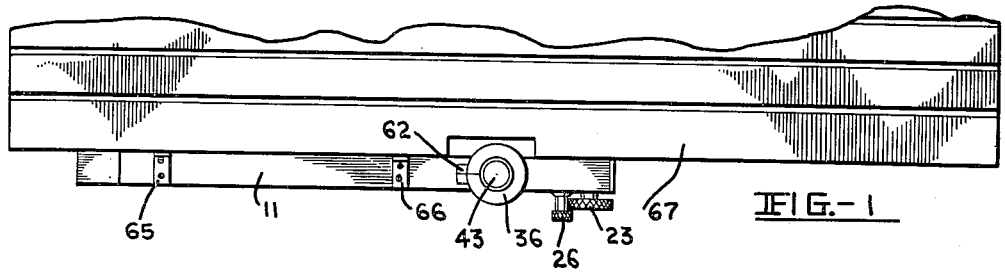
Figure 2:
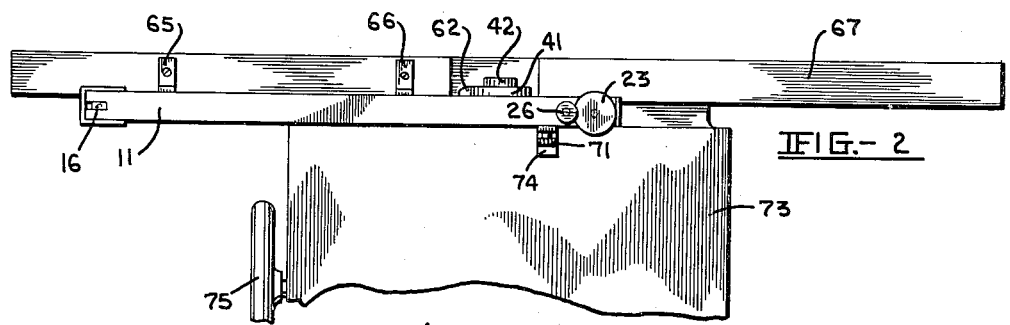
FIG. 2 is a view of the device in side elevation.

The device thus far described is mounted on the table 67, FIGS. 1 and 2. This mounting may be had by any suitable means, herein shown as by use of the two angle brackets 65 and 66, one leg of which is secured to the top of the tube 11 and the other side to the side edge of the table 67. In this position, the dial 36 is on the upper side of the tube 11 and preferably horizontally disposed. The exact location of the mounting of the tube 11 along the table 67 is not critical but may be at any suitable position therealong, preferably so that it does not overhang the table.

The lower flight 19b of the tape 19 passes through a grip block 68 which enters the tube 11 through the under slot 12. This grip block 68 has a head 69 which is slotted as at 70 therethrough, FIG. 10, to permit the tape flight 19b to travel freely therethrough. A thumbscrew 71 screw-threadedly passes upwardly from the bottom side of the block 68 to press a washer 72 upwardly against the underside of the flight 19b to clamp the tape flight 19b between that washer 72 and the upper side of the slot 70. The flight 19b may be disengaged from this clamping action of course by turning the thumbscrew 71 in the reverse direction. The block 68 is anchored to the fixed portion of the cutting machine, such as the pedestal or body 73, FIG. 2, by any suitable means such as by a bracket 74 fixed to the under side of the head 68 by one leg and by the other leg directly to the base or pedestal 73.

First it is to be seen that when the thumbscrew 71 is in its loosened condition, that is the condition in which the flight 19b is not clamped, the table 67 may be shifted across the pedestal 73 with the tape flight 19b sliding through the slot 70. However when the screw 71 is turned into its tape clamping position, the tape 19b will then be stationary, not in respect to the table 67, but in respect to the base 73. Then when the table 67 is shifted, the tape will remain stationary, which means that it relatively travels around the pulleys 13 and 21.

Taking into consideration the direction in which the measurement is to be made in relation to the travel of the table 67, the table 67 is shifted by any suitable means, such as by the hand wheel 75, FIG. 2, to what would be selected as a zero position. In this position, the screw 71 is in the clamp released position. The wheel 23 is turned to drive the tape 19 into its "zero zero" position which will be that position wherein the top and bottom zeros along the tape 19, the only position in which there are the two zeros one opposite the other across the tape, to a center of the plate opening 39 as near as possible, and as will then be determined more accurately by turning the dial 36 to its zero position in reference to the reference line 64. The lamp 44 is illuminated, and by use of the smaller wheel 26 the beam may then be brought into registry with the zero zero hole of the tape in alignment with the hole 55 through the tongue 54. Then the screw 71 is manipulated to clamp the tape in the block 68.

Travel of the table 67 in accordance with the predetermined measurement as above indicated which may be taken from a blueprint or drawing may be determined by noting the travel of the tube 11 along the then stationarily held tape 19. Inches will always be indicated in the upper row and tenths of inches will be indicated in the lower row. Which reading from zero in both rows is selected will depend of course as above indicated upon which direction the table is to travel in making the desired cut on the work models on the table. For example, if the table is traveling to the left, the set of figures along the tape to the left will be observed through the lens 43. This will give the measurement in inches and tenths, and then the dimension in the plus or minus thousandths will be determined by rotation of the dial 36 in reference to the line 64.

In this manner it will be observed that there is no measuring between various points, but only an overall measurement from the "zero zero" position which is had without adding or subtracting any other figures to obtain that initial setting. All that has to be taken into account then is the inches, tenths, and thousandths which are readily observed at the dial 36.

In reference to the modified structure of FIGS. 13 and 14, this structure employs a linear system of operation rather than the rotary operation as has above been described. In FIG. 13, the same tape 19 is employed, with the holes incidentally modified to square holes 27a. The particular contour of the hole as above indicated is not critical, providing the aligning feature is provided with an aperture of like contour.

Referring to FIG. 13, there is a short scale designated by the numeral 76 which is fixed to the tube 11. This scale carries a set of numerals indicating thousandths between zero and two hundred reading in one direction and on the other side reading in the opposite direction.

A slider head 77 slidingly fits within a slot 78 extending centrally and longitudinally of the scale 76. This slider head 77 is fixed below the scale 76 to a cam member 79 which slidingly engages a block 80 which is vertically, slidably guided by means not shown, for motion at right angles to the scale 76. The underside of the block is provided with an angular face 81 herein shown as being at forty-five degrees from the vertical. This face 81 is in the path of a second cam block 82 which is compressibly urged toward the face 81 by any suitable means such as a spring (not herein shown). This second block 82 is fixed to a tongue 83 constrained by means not shown to travel parallel to the scale 76 which extends longitudinally and centrally of the tape 19, FIG. 13, and carries a rectangular opening 84 entering from one side, this opening being in the nature of a slot so that there will be an opening through the tongue 83 in alignment with the openings 27a of the tape 19 so as to accommodate for any lateral variation between tongue 83 and the tape holes 27a. The relative slopes of the cam faces of the members 79 and 82 are such that the tongue 83 is moved with movement of the member 79 but at a reduced scale in this modified form, by shifting the slider head 77 along the slot 78, the reference line 85 will be registrable with the scale lines, to be observed when the opening 84 of the tongue 83 is in alignment with one of the holes 27a as determined by the beam of light coming upwardly therethrough from the lamp 44. The same principle prevails in this modified form as prevails in the rotary indicating system through the dial 36.

Thus it is to be seen that I have provided a very simple structure for the purposes indicated, and which may be readily manipulated without any precalculations, and which is extremely reliable for accuracy and for durability. While I have herein shown and described my invention in the one particular form in more or less detail, it is obvious that structural changes may be employed without departing from the spirit of the invention, and I therefore do not desire to be limited to that precise form beyond the limitations which may be imposed by the following claims.

I claim:

1. The combination with a machine having a moving member and a member fixed relative to the moving member, of a device for measuring travel of said moving member relative to said fixed member, comprising a tube; an endless tape; a tape holder at each end portion of the tube tensioning the tape therebetween and around which holders said tape may travel in two flights; said tube having a slot extending longitudinally therealong through one side; a tape clamp bracket extending through said slot and through which one of said flights may slidingly extend; clamping means carried by said bracket selectively clamping said one flight to the bracket; means mounting said bracket in fixed position on said fixed machine member; means mounting said tube on said machine moving member; said tube having an opening through its uppermost side, through which opening the second of said flights may be visible; measurement indicia being positioned along opposite edge portions of the tape in fixed arrangement starting from a zero position on one edge portion and a zero position in transverse alignment with the first said zero position on the other edge portion, said tape further having a series of spaced apertures therethrough and therealong in approximately central alignment between said two series of indicia; means operable to shift said tape to a zero position; a source of light carried by said tube directing a light beam through said apertures in accordance with movement of said tube relative to said tape; a fine reading device reading in subdivisions of said indicia; and means actuating said fine reading device, said fine reading device including a shiftable, apertured tongue aligning its aperture with one of the apertures in said tape.

2. The structure of claim 1 in which said tape holders are pulleys; there is a shaft carrying each pulley; and said operable means comprises a wheel mounted on one of said shafts externally of said tube; and one of said shafts is spring urged in a direction away from the other shaft.

3. The structure of claim 1 in which said light source is fixed to said tube and between said two tape flights.

4. The structure of claim 1 in which said fine reading device comprises a circular dial graduated in divisions; a reference point past which said divisions may travel; a cam ring carrying said dial, the internal surface of which constitutes a cam surface, a cam follower yieldingly urged against said surface; said tongue being carried by said follower and extending therefrom longitudinally of said tape.

5. The structure of claim 1 in which said fine reading device comprises a linearly shiftable slide, a tongue; means between said slide and said tongue shifting the tongue longitudinally of and over said tape apertures in increments of travel of said slide, and a scale along which said slide moves.

References Cited in the file of this patent

UNITED STATES PATENTS

| 819,243 | Mothes | May 1, 1906 |
| 1,179,264 | April | Apr. 11, 1916 |
| 2,577,069 | Brewer | Dec. 4, 1951 |
| 2,583,371 | Guttmann | Jan. 22, 1952 |

FOREIGN PATENTS

| 2,129 | Great Britain | Jan. 26, 1912 |
| 261,171 | Great Britain | Nov. 18, 1926 |